(12) United States Patent
Rist et al.

(10) Patent No.: US 9,925,696 B2
(45) Date of Patent: Mar. 27, 2018

(54) IRRADIATION AND MOLDING UNIT

(75) Inventors: Stefan Rist, Leverkusen (DE); Clemens Trumm, Sankt Augustin (DE); Holger Albrecht, Bergisch Gladbach (DE)

(73) Assignee: Momentive Performance Materials GmbH, Leverkusen (DE)

( * ) Notice: Subject to any disclaimer, the term of this patent is extended or adjusted under 35 U.S.C. 154(b) by 460 days.

(21) Appl. No.: 14/238,572

(22) PCT Filed: Aug. 17, 2012

(86) PCT No.: PCT/EP2012/066057
§ 371 (c)(1),
(2), (4) Date: Feb. 12, 2014

(87) PCT Pub. No.: WO2013/024146
PCT Pub. Date: Feb. 21, 2013

(65) Prior Publication Data
US 2014/0191445 A1    Jul. 10, 2014

(30) Foreign Application Priority Data
Aug. 18, 2011    (EP) .................................. 11177959

(51) Int. Cl.
  *B29C 35/08*    (2006.01)
  *B29C 33/00*    (2006.01)
  *B29C 35/16*    (2006.01)

(52) U.S. Cl.
  CPC .......... *B29C 35/08* (2013.01); *B29C 35/0805* (2013.01); *B29C 35/0888* (2013.01); *B29C 2033/0005* (2013.01); *B29C 2035/0827* (2013.01); *B29C 2035/1616* (2013.01)

(58) Field of Classification Search
  CPC ................ B29C 35/08; B29C 35/0805; B29C 2035/0827; B29C 2035/1616

USPC ........................................ 264/496; 425/174.4
See application file for complete search history.

(56) References Cited

U.S. PATENT DOCUMENTS

| | | | |
|---|---|---|---|
| 5,885,514 A | 3/1999 | Tensor | |
| 6,627,124 B1 | 9/2003 | Herbrechtsmeier et al. | |
| 2005/0146084 A1* | 7/2005 | Simoneta | B29C 59/022 264/479 |
| 2006/0279025 A1* | 12/2006 | Heidari | B29C 33/3857 264/496 |
| 2008/0230721 A1* | 9/2008 | Matsushita | H01L 21/6715 250/492.2 |

(Continued)

FOREIGN PATENT DOCUMENTS

GB    1101202    1/1968

OTHER PUBLICATIONS

International Search Report for corresponding PCT/EP2012/066057 dated Oct. 25, 2012, two pages.

(Continued)

*Primary Examiner* — Alison L Hindenlang
*Assistant Examiner* — Mohamed K Ahmed Ali
(74) *Attorney, Agent, or Firm* — Rankin, Hill & Clark LLP

(57) ABSTRACT

The invention relates to an irradiation and molding unit which can be cooled for curing light-curable polymer compositions, a method for preparing cured polymer moldings or articles coated with cured polymers by using the irradiation and molding unit which can be cooled, as well as the use of such irradiation unit for preparing polymer moldings or polymer coated articles.

15 Claims, 7 Drawing Sheets

1  cooling channel
2  UV light source
3  pump
4  cavity
5  UV transparent insert
6  metal mold

(56) References Cited

U.S. PATENT DOCUMENTS

2009/0224433 A1\* 9/2009 Kurihara ................. B29C 33/06
                                                        264/402
2011/0304079 A1\* 12/2011 Kurihara ............... B29C 33/405
                                                        264/402

OTHER PUBLICATIONS

International Preliminary Report on Patentability dated Feb. 27, 2014, 11 pages.

\* cited by examiner 1 cooling channel

2 UV light source 3 pump 4 cavity

5 UV transparent insert 6 metal mold 1 cooling channel

2 UV light source 3 pump 4 cavity

5 UV transparent insert 6 metal mold

Comparison Increase in Temperature with and without water-cooling

IRRADIATION AND MOLDING UNIT

The invention relates to an irradiation and molding unit with one or more sources of UV light for curing light-curable polymer compositions. The irradiation and molding unit of the invention allows the highly efficient production of polymer moldings or polymer-coated articles in particular of silicone molded articles either in continuous or batch process. The irradiation and molding unit of the invention, in particular increases the lifetime of the transparent molds from polymeric molding materials, in particular those from polyacrylates. Polyacrylate moldings which are exposed to direct radiation, for example a conventional UV light source equipped with a mercury lamp with a broad radiation spectrum, deform, discolor, and reduce their UV transmittance on the irradiated surface after a few moldings and therefore so far have to be replaced after short use. due to the lavishly produced high-precision mold cavities or large-volume molds this is uneconomical. However, depending on the costs for manufacturing a mold, for example from polyacrylate, a use of at least 50, preferably at least 100 moldings or irradiation curings without causing a significant reduction in the UV transmittance and the curing rate is desired.

The irradiation and molding unit of the invention may particularly be used for the production of molded articles from photo-curable polymers, in particular for the production of elastomer molded articles, thermoset molded articles, thermoplastic molded articles or molded articles of thermoplastic elastomers.

In addition, the irradiation and molding unit of the invention shall be as compact as possible, which is required by the structure of many injection molding machines. Therefore, the irradiation unit of the invention is tightened to the correspondingly provided mold holding device in the injection molding machine. In this position the machine controlled filling, opening and closing of the mold cavities with the light-curable polymer composition is possible. Compared therewith, larger voluminous irradiation units would require complex injection molding machines with correspondingly large mold holding devices, which need to be produced individually, leading to significantly increased costs.

From the prior art molds having transparent windows are known, which can be considered for molding and chemical cross-linking of light-curable polymers. U.S. Pat. No. 5,401,155 describes a metal mold having a light-transmissive window on the front side, which is placed perpendicular to the light source. U.S. Pat. No. 6,627,124 claims a two-part mold for the manufacture of lense bodies in which one half of the mold consists of a transparent material. U.S. Pat. No. 5,885,514 teaches a method for molding and curing seals on a sealing plate with a transparent upper and a lower mold half. US 2007/141739 A1 discloses the curing of silicone moldings for the encapsulation of light emitting diodes (LED's).

Due to the strong heat generation of conventional light sources, the production of larger molded articles from light-curable polymers with the light sources available so far always required a compromise between the available UV light-transmissive, transparent elements and the permitted irradiated light power. To provide inexpensive, easily processable and durable light-transmissive elements, i.e. windows, the transparent materials must meet a series of demands for the entry of light. They must allow transmission of the UV light of the desired wavelength as complete as possible without absorption losses. If they are part of the shaping mold cavity, they should, in particular be processable by easy molding. This means, that the desired contours of the mold wall should be designed and processed with simple means. On the one hand silica glass is an ideal UV light-transmissive material, which is further heat and scratch resistant, however, it is difficult to shape by surface-processing methods and has a high price. Although transparent elements made of silica glass can certainly be used as the mold cavity wall or the entrance window in a mold in a manner that reduces the mechanical stress and reduces the risk of breakage, however, the use is bound to certain conditions. The brittleness of the silica glass must be considered as well as the adhesion between the silica glass and some photo-cured polymers, with which it can adhesively connect. This complicates the separation of the molded article after curing. Other saline or mineral glasses have similar advantages and disadvantages. However, these materials are quite suitable for simple designed mold cavities or injection channels, wherein smaller planar workpieces can be inserted as a transparent window.

Transparent thermoplastics, which can be considered as an alternative, are not sufficiently heat resistant, and under the previously known UV irradiation conditions their lifetime is too low. The light sources used during UV irradiation affect the transparent moldings via different mechanisms. On the one hand the very short-wavelength range of UV radiation leads to damages of the polymer structure and on the other hand, the heat development in the light sources used for the UV irradiation or the amount of radiation in particular in the IR range leads to an increased heat development in the transparent moldings. The heating of the transparent molded materials caused by the UV light sources results in their extension, which adversely affects the geometrical accuracy of the molded articles produced therein. The problem of heat development is certainly more serious, the more compact the irradiation and molding units are built.

On the other hand, it is advantageous that, compared to silica glasses, many transparent thermoplastics can be easily processed to shaping elements for use in molding channels or in or to mold cavities (mold cavities).

The inventors of the present patent application therefore set themselves the object to be solved to provide an irradiation and molding unit which is as compact as possible and yet stable, which is suitable for a variety of injection molding machines.

One approach initially related to cooling of the used transparent molds by contacting the molds with a suitable liquid coolant, but not in those areas which transmitted the UV light from the UV lamps, because so far this has been considered detrimental to the curing. With this type of cooling heat is naturally dissipated at the interface between the cooling medium and the transparent mold. By thermal conduction within the molding material, a certain heat dissipation in the area of the transparent mold, which is transmitted by the UV light, is achieved, too. However, the achieved heat dissipation is regarded as still insufficient, certainly, in particular in the areas which are not directly in contact with the liquid coolant, particularly the transparent areas. The inventors of the present patent application therefore searched for possibilities to improve the cooling of the transparent molded articles, in particular of those made from thermoplastic materials, for the incorporation of UV-curable resin compositions and thereby improve their durability. Various possibilities have been considered, such as the use of less heat-generating LED UV light sources. However, these still often produce too little radiation energy. Another possibility has been seen in the cooling of the UV radiation sources itself in order to reduce the heat emission, as shown for example in US 2002/0118541 (A1). However, here too, the heat dissipation, especially in the area of the transmitted areas of the transparent molds, is still too low. In addition, the cooling of the UV radiation sources is associated with an increased complexity of the technical equipment, associated with increased costs.

Surprisingly, the inventors of the present patent application now found, that an optimal, yet inexpensive cooling, and along therewith, an elongation of lifetime of the transparent moldings is possible. The positioning of the cooling device according to the invention results in a lower extension of the mold and consequently in an increased precision of shape and dimensional stability of the cured molded articles. The subsequently described irradiation and molding unit retains the ability to achieve a compact design. It comprises a liquid layer which is located between the transparent layer and one or more UV light sources. Therein, the cooling liquid layer is not fixed to the UV light sources neither is it a part thereof, as schematically illustrated in FIGS. 1 to 3. Nevertheless, cooled mold and UV light source may optionally form an integral irradiation unit. The decisive factors are the location and positioning of the liquid layer. Particularly surprisingly, with this arrangement the rate of crosslinking of the curable polymer composition in the transparent mold is not significantly reduced. Further, cooling of the transparent molding can be achieved either by heat transmission between the liquid layer and the transparent molding as well as by selective absorption of heat and IR radiation, which is emitted from the UV radiation source, without the need of particular technical measures on the UV radiation source. By using the irradiation and molding unit of the invention deformation, discoloration and clouding of the transparent molding elements due to excessive irradiation is strongly suppressed. The inventors have further succeeded in creating a device, wherein in particular thermoplastic UV light-transmissive elements can be used, without burdening them to the limit of the heat resistance, but at the same time introduce a high light power per time into the polymer composition to be cured. In terms of their compatibility (interaction with the light-curable polymers) the transparent elements can be adapted to the light curable polymers. As a result, with the device of the present inventive significantly longer lifetimes of the transparent moldings can be achieved, leading to an overall increased UV light yield based on the energy and radiation power used. The device generally allows processing methods with a low tool temperature, which is, for example, advantageous for the 2-component injection molding, when the composite component is heat sensitive, or when the injection of inserts, made of plastic with low heat resistance, shall be carried out. Further, the invention allows the production and application of compact, integral molds for the preparation of light-cured molded articles, wherein the UV-transparent materials of the moldings, despite superimposed liquid layer, are sufficiently UV light-transmissive and exhibit, due to the liquid layer, a long lifetime with reduced tendency to brittleness and clouding.

The present invention thus provides an irradiation (and molding) unit (hereinafter shortly also referred to: irradiation unit) for curing light-curable polymer compositions comprising:
one or more UV light sources for irradiating at least one transparent layer which is in contact with the light-curable polymer composition, and which is located between the UV light sources and the light-curable polymer composition,
at least one mold for receiving the light-curable polymer composition, and
at least one liquid layer located between the transparent layer and one or more UV light sources, and which is not permanently fixed to the UV light sources.

Therein, the term "not permanently fixed to the UV light sources" means that the liquid layer is not part of the UV light source or its housing. Rather, the liquid layer is generally arranged apart from the UV light source or its housing. However, the irradiation (and molding) unit may contain the liquid layer and the UV light source in an arrangement fixed to each other. However, even in these cases the UV light source is still a unit separated from the liquid layer, is thus prepared, sold and used separately from the liquid layer.

DESCRIPTION OF THE FIGURES

One embodiment of the irradiation and molding unit of the present invention is schematically illustrated in FIG. 1. In this embodiment of the irradiation unit of the present invention, the liquid layer is in direct contact with the transparent layer and the liquid layer is open to the side of the UV light source, this means not enclosed by a coating. This particularly simple embodiment of the irradiation and molding unit of the present invention may be realized, for example, by passing a liquid film over the transparent layer. The thickness of the liquid layer can be varied by providing correspondingly high side walls in the region of the liquid layer.

A further embodiment of the present invention is schematically illustrated in FIG. 2. This embodiment distinguishes from the embodiment illustrated in FIG. 1 by the fact that the liquid layer is, so to speak, enclosed conducted between the transparent layer and a transparent covering layer. Therein sealing elements can be provided between the transparent layer and the transparent covering layer (not shown), which effectively prevent leakage of the liquid layer.

Figure 1:
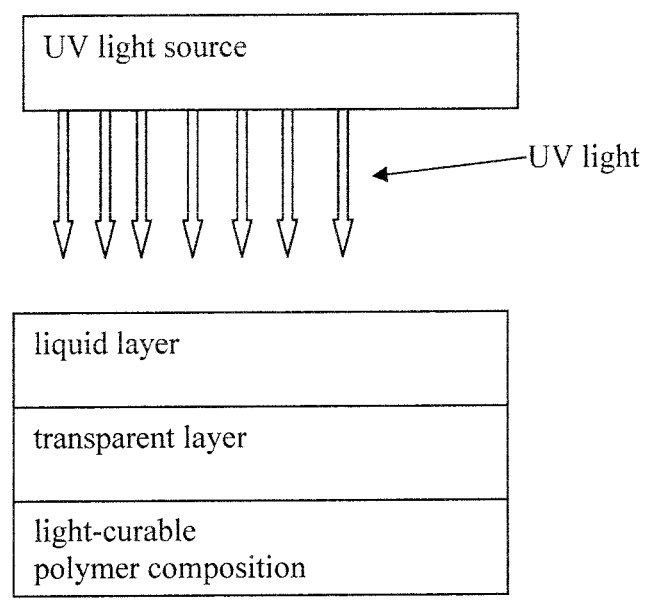
Figure 2:
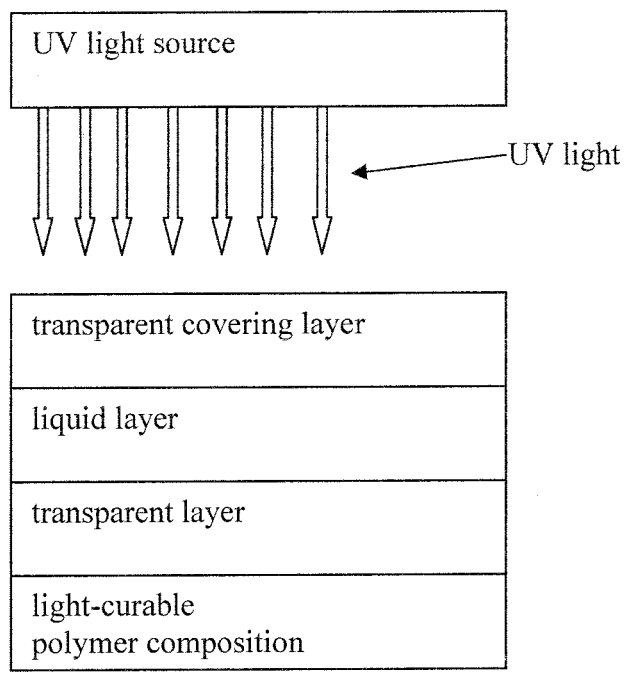
Figure 3:
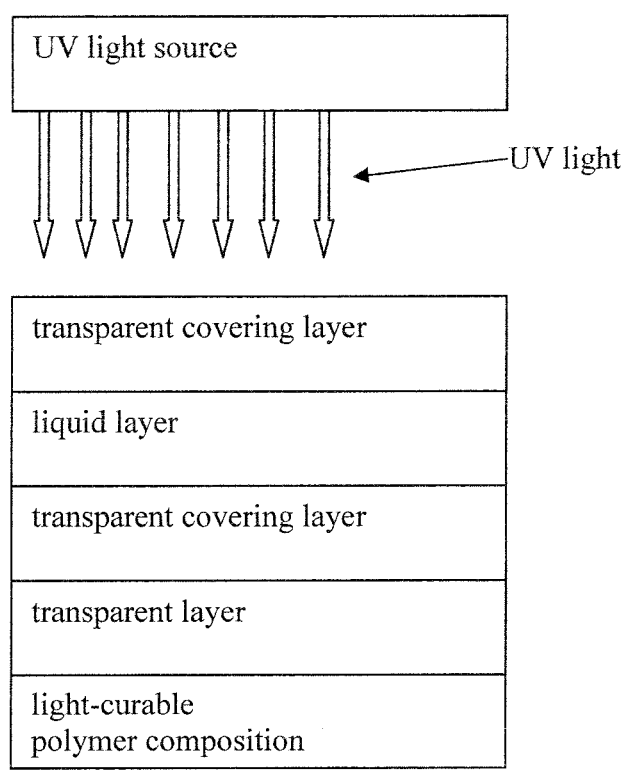

A further embodiment of the present invention is schematically illustrated in FIG. 3. This embodiment distinguishes from the embodiment illustrated in FIG. 1 by the fact that the liquid layer is surrounded by a transparent covering layer on both sides. In the embodiment illustrated herein, the transparent conversion layer on the side facing away from the UV light source is in direct, form-fitting contact with the transparent layer, which is in contact with the light-conducting polymer composition. This embodiment offers the advantage that the elements receiving the liquid layer do not have to be in firm contact to the transparent layer, which facilitates exchange of the liquid layer and the covering, together also referred to as cooling channel. This has the advantage that the liquid layer or the cold or heat absorbing layer, respectively, can be provided as a separate component, which can be quickly replaced with decreasing UV transmittance of the transparent covering layers during operation. The transparent layer, generally being present as a part of the mold for receiving the light-curable polymer composition, is not affected and its durability is increased.

Figure 4:
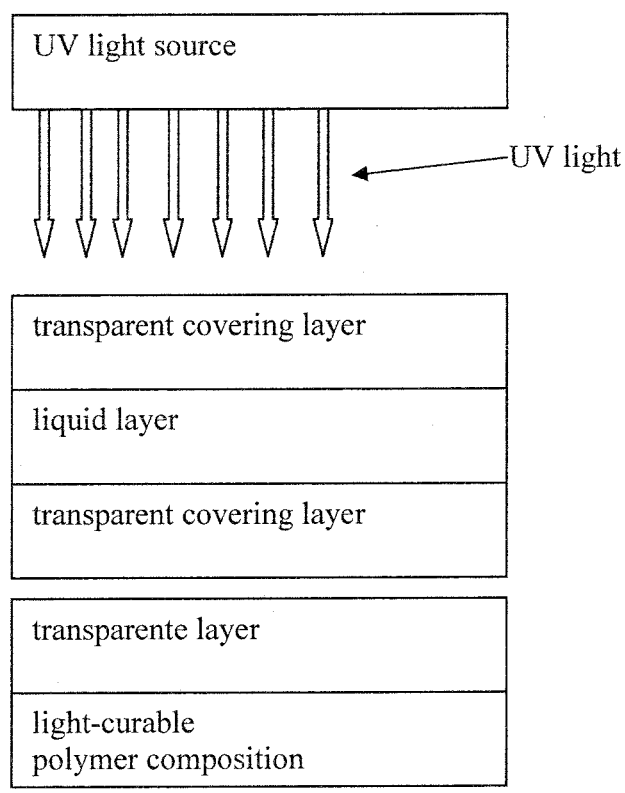

FIG. 4 illustrates a special embodiment of the embodiment of FIG. 3, in which the liquid layer, being surrounded by the two transparent covering layers, is separated from the transparent layer. This embodiment allows to push the liquid layer as a replaceable cooling plate in a simple manner between the transparent layer and the UV light source, too. In many cases the cooling effect in this embodiment, wherein the encapsulated liquid layer is separated from the transparent layer, is sufficient, too. By passing a preferably cooled air current between the encapsulated liquid layer and the transparent layer, an additional cooling effect can be achieved.

Figure 5:
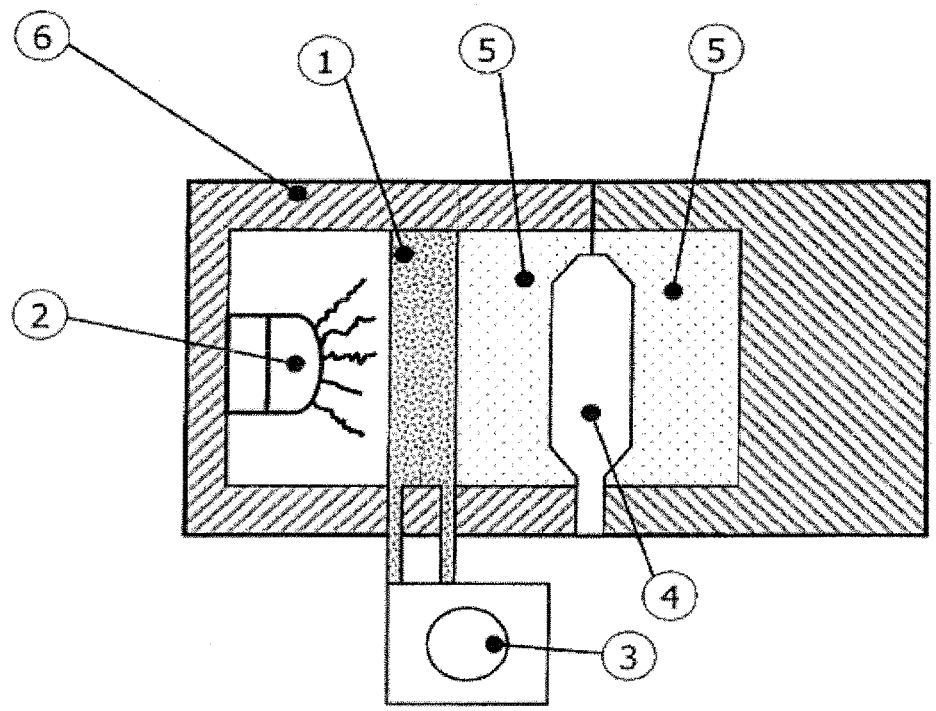

FIG. 5 illustrates a concrete embodiment of an irradiation and molding unit of the present invention in which the liquid layer is in direct contact with the UV-transparent layer. The liquid layer is encapsulated on the side facing towards the UV lamp. On the side facing towards the UV-transparent layer the liquid layer can be in direct contact with the UV-transparent layer, or a further covering layer may be provided between the liquid layer and the UV-transparent layer. In the latter case, the elements forming the liquid layer may be provided as a separate replaceable component. Even if only one covering layer is provided on the side facing towards the UV light source, it can easily be replaced in case of decreasing transparency.

Figure 6:
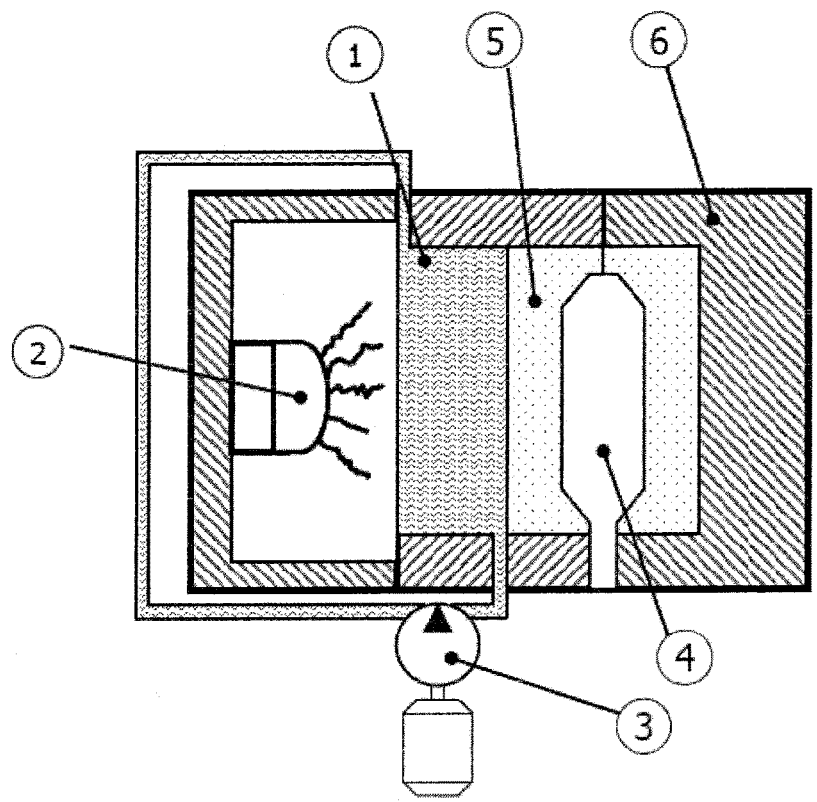

FIG. 6 illustrates a further concrete embodiment of an irradiation and molding unit of the present invention in which the liquid layer is in direct contact with the UV-transparent layer. Therein the liquid present in the liquid layer is recirculated. In the resulting cooling circuit a heat exchanger is preferably incorporated (not shown). Also in this embodiment, the elements comprising the liquid layer can be formed as a replaceable component.

Figure 7:
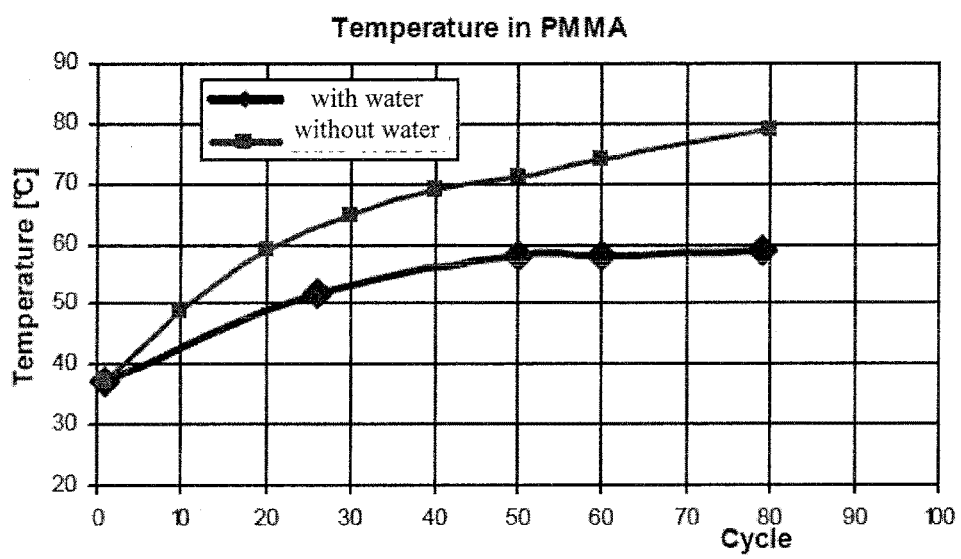

FIG. 7 illustrates the temperature development in the transparent layer, depending on the number of irradiation cycles for an embodiment of the invention corresponding to the embodiment illustrated in FIG. 3, wherein the transparent layer is formed as a part of the mold for receiving the light-curable polymer composition from polymethylmethacrylate (PMMA). As a liquid layer a flowing water layer of about 20° C. was used. The liquid layer was encapsulated and was in direct contact with the PMMA layer. As can be seen from the FIG. 7, the use of the liquid layer according to the invention leads to a significant reduction in temperature in the PMMA molding layer which in this way is subject to a considerably lower yellowing, has no deformation, and its lifetime with respect to the UV light transmission is considerably extended.

According to current knowledge the liquid layer used in the irradiation unit according to the invention substantially meets the following functions.

First, it cools down the transparent layer, in particular in the region which faces towards the UV light source or which is transmitted by the UV light, by absorbing and dissipating heat from the transparent molding layer. On the other hand it absorbs heat or IR radiation, which is generated in the UV light sources and thereby prevents a resulting heating of the transparent molding layer and the deformation thereof. In addition, the liquid layer may be designed to absorb parts of the shorter-wavelength portion of the UV light, which can also reduce the lifetime of the transparent molding layer. Surprisingly, by this comparably simple construction in particular a particularly efficient cooling of the transparent molding layer and consequently an extension of the lifetime as well as a low deformation of the transparent molding layer corresponding to an increased precision of shape of the prepared cured molded articles is achieved.

DESCRIPTION OF THE PREFERRED EMBODIMENTS OF THE INVENTION

In a preferred embodiment of the present invention the irradiation and molding unit is characterized in that the thickness of the liquid layer is between 0.01 mm to 50 mm, preferably 1-10 mm. The above-mentioned thickness actually includes only the thickness of the liquid layer and not the thickness of any optionally surrounding covering layers. If the thickness of the liquid layer is too low, the filter effect (temperature and radiation) in some cases is not sufficient. A thickness higher than 50 mm is generally not useful, since it provides no additional contribution to cooling.

In a further preferred embodiment of the present invention the irradiation unit is characterized in that the thickness of the liquid layer is sized such that at least 70%, preferably at least 80%, more preferably at least 90% of the portion of the total radiation of the UV light sources in the range of >700 nm is absorbed.

In a further preferred embodiment of the present invention, the irradiation unit is characterized in that the liquid layer is in contact with said transparent layer and in contact with the UV light sources. Such an embodiment may for example be realized in that the liquid layer stands or flows over the transparent layer by using suitable side walls, with the UV light sources immersing in the liquid layer or touching it.

However, it is more preferred, that between the one or more UV light sources and the liquid layer a spacing in the range of at least 1 mm, more preferably >10 mm, more preferably >30 mm is provided. Preferably, the spacing is a maximum of 150 mm, more preferably at most 100 mm. This results in preferred corresponding ranges of, for example, 1 to 150 mm and 10 to 100 mm.

In a preferred embodiment, the irradiation unit has means for exchanging the liquid in the liquid layer. Such means ensure that the liquid is recirculated in the liquid layer. This can preferably be carried out in a circuit with attached heat exchanger. Preferably, the mass flow rate in the liquid layer is at least 0.1 g/(min·cm$^2$), more preferably 0.5-50 g/(min·cm$^2$), even more preferred 5-10 g/(min·cm$^2$).

In a preferred embodiment of the present invention, the liquid layer is in direct contact with the transparent layer, which is transmitted by the UV light, and which is in contact with the light-curable polymer composition. In this way, naturally more heat is dissipated from the transparent layer, as in the embodiment in which there is a covering layer between the liquid layer and the transparent layer. The embodiment of the irradiation unit in which the liquid layer is located between the transparent layer and a transparent covering layer, and is in contact with these, is, however, in many cases sufficient for heat dissipation. This embodiment generally allows an easier exchange of the elements which conduct the liquid layer.

In a further preferred embodiment of the irradiation unit of the invention it is characterized in that the liquid layer is located between two transparent covering layers, which are located between the UV light sources and the transparent layer. Here, as mentioned above, the transparent covering layer facing towards the transparent layer can be in contact with the transparent layer or be separated therefrom. Notwithstanding, this embodiment has the advantage that the component comprising the liquid layer, consisting of the two covering layers and the intermediate liquid layer and the optional peripheral devices (connections, heat exchangers, etc.) and which is formed, for example, in the manner of a cooling plate, can easily be taken out of the light path of the UV light and can be exchanged against another corresponding new component without major maintenance work being necessary. This is always required when the transparency, particularly of the covering layer facing towards the UV light source, has decreased so far that the curing rate becomes unacceptable.

As already mentioned, the embodiment wherein the covering layer facing away from the UV light source is in contact with the transparent layer, has the advantage of better heat dissipation in the transparent layer. In a preferred embodiment, the liquid layer is in contact with a heat exchanger to dissipate the heat generated in it. Preferably, the liquid of the liquid layer absorbs infrared radiation. Simultaneously, however, it must be transmissible for UV radiation, since this causes the curing of the light-curable polymer composition. In a preferred embodiment, the liquid of the liquid layer is selected from the group consisting of: water, aliphatic alcohols, hydrocarbons, ionic liquids and salts, and mixtures thereof. The liquid of the liquid layer can additionally contain one or more IR-absorbing additives. Such IR-absorbing additives include for example, soluble or colloidal IR absorbing additives, which, however, absorb as little as possible UV light, such as, for example, organic compounds having respective absorption spectra or suitable colloidal oxides or hydroxides of metals such as Al, B, Ce, In, Sn or semi-metals such as Si, Ge, which may optionally be modified with organic groups.

In a further embodiment of the irradiation unit, this is characterized in that additionally not fluid-based IR radiation filters are positioned between the UV light source and the transparent layer. Such IR radiation filters include, for example: wavelength-sensitive filter or dichroic mirror elements. In the irradiation unit of the invention at the UV light source, including any filter elements, the portion of the total radiation in the range of >700 nm is less than 15% and in the range of <300 nm is less than 15%.

In a further embodiment of the irradiation unit of the present invention this is characterized in that it comprises one or more light-conducting and/or light-reflecting elements.

In a further embodiment of the irradiation unit of the invention it is characterized in that it comprises one or more injection channels for the light-curable polymer compositions.

The UV light sources used in this invention are preferably selected from: UV-fluorescent lamps, high pressure mercury vapor lamps, UV arc lamps, metal halide lamps, xenon lamps, flash lamps, undoped or Fe or gallium doped mercury lamps, and black light lamps. Particularly preferred are Fe or gallium doped mercury lamps.

In the irradiation unit of the invention, the distance between the liquid layer and the UV light source is fixed or variable. A variable distance can be advantageous to provide the possibility, if desired, to insert additional elements such as filters or screens into the light path.

The irradiation unit of the invention is preferably designed so that it consists of several sub-components which form the assembly of the irradiation unit. In general, it consists of the sub-components: UV radiation source component, the component receiving the liquid layer, and the molding component. The assembly of these components can be provided rigid or detachable, the latter embodiment being preferred, since it allows an exchange of the individual components. In a further embodiment of the irradiation unit, this comprises one or more injection channels for the light-curing polymer composition, which effect filling of the mold wherein curing takes place.

The irradiation unit of the invention has a transparent layer which is in contact with the light-curable polymer composition, and through which the UV light penetrates the light-curable polymer composition and effects its curing. Preferably, said transparent layer can be part of the mold for receiving the light-curable polymer, wherein curing takes place. However, it is also possible to provide the transparent layer in the said injection channels. Such injection channels can, for example, be constructed like an exposure station. In this embodiment naturally no curing takes place in the injection channels, that is, the irradiated polymer composition remains flowable, enters the mold and is cured therein. Generally, this is the case when the irradiation time is less than the so-called gel time (see for example EP 1817372 B1). Also in this embodiment, a cooling and thus extension of the lifetime of the transparent area, generally made from thermoplastic polymers (in particular PMMA), is achieved by the irradiation unit according to the invention, and the temperature of the irradiated light-curable polymer composition, therefore also the temperature in the curing mold, is reduced. This leads in turn to a higher shape precision in the final curing in the curing mold. In the irradiation unit according to the invention, the transparent layer which is in contact with the light-curable polymer composition, preferably consists of a thermoplastic polymer material. Such polymer materials preferably include polymethacrylates, as will be explained in more detail below. In a preferred embodiment the entire mold for receiving the light-curable polymer composition consists of the thermoplastic polymer material.

However, according to the invention it is also possible that the mold for receiving the light-curable polymer composition comprises non-transparent areas, which are formed, for example, of metals. In the case that the radiation occurs in the region of the injection channels, the entire mold for receiving the light-curable polymer compositions (sometimes referred to as curing mold) can be made of non-transparent materials.

In a further embodiment of the present invention, the irradiation unit can have a plurality of UV light sources.

UV light sources used in accordance with the present invention preferably have a radiation of at least 0.1 mW/cm$^2$.

The irradiation unit of the invention can be used for continuous or batchwise production of cured polymer moldings, or for the production of articles having a cured polymer layer. In the latter case, the light-curable polymer composition is in contact with a substrate to be coated.

The irradiation unit of the invention is preferably used for curing light-curable silicone compositions which are explained in more detail below.

According to the invention a sub-component of the irradiation unit, which does not include the UV light source, is claimed, too. With this sub-component, the irradiation unit of the invention can be formed in a simple manner by adding commercially available UV light sources.

Accordingly, the present invention also comprises a mold assembly for curing light-curing polymer compositions comprising:
 at least one mold for receiving a light-curable polymer composition
 at least one transparent layer, which is in contact with the light-curable polymer composition and which is transmissible for the UV irradiation, and
 at least one liquid layer, which is arranged such that it is irradiated by irradiation of the transparent layer.

For this to some extent molding unit without UV light source, the explanations for the irradiation and molding unit according to the invention apply accordingly. With this molding unit, the irradiation and molding unit of the present invention may be formed by adding one or more UV light sources.

The invention further relates to a process for the preparation of cured polymer moldings or articles coated with cured polymers, wherein one or more light-curable polymer compositions are cured using the irradiation unit of the invention. Said process preferably comprises the steps of:
a) optionally, assembling the components of the irradiation unit,
b) optionally inserting one or more articles to be coated into the mold for receiving the light-curable polymer composition,
c) introducing one or more light-curable polymer compositions into at least one or all of the existing molds, optionally by one or more injection channels,
d) irradiating the light-curable polymer compositions through the transparent layer in the region of the injection channel and/or the mold for receiving the light-curable polymer composition,
e) continuous or batchwise removal of the cured polymer moldings or the polymer-coated articles.

In a preferred embodiment of the process this additionally comprises the steps:
a) determination of the effective wavelength range for activating the curing,
b) selecting an UV light source having a maximum radiation in the effective
c) wavelength range.

An adaptation of the absorption performance provided by the liquid layer can be carried out. The effective wavelength range for curing the light-curable polymer composition is preferably in the range of 345 to 385 nm (absolute or local maximum of the wavelength range).

The present invention further provides the use of the irradiation unit for the preparation of polymeric molded articles or polymer coated articles.

With the irradiation unit according to the invention in principle any photo or light-curable composition can be cured, such as, for example, various acrylates, acrylate derivatives, aliphatic or aromatic epoxides as disclosed in EP 0826431 A1, further vinyloxy derivatives, mercaptan substituted aliphatic or aromatic monomers or oligomers, unsaturated polyesters, bisallyl substituted ammonium compounds as disclosed in EP 548 826 A2 or EP 1265942 A2 including their mixtures with one another or mixtures with transparent fillers and silicone rubber compositions etc. Further light-curable polymer, oligomer and/or monomer compositions (A), which may optionally be used in combination with the components (A1) and (A2), are, for example, various acrylates, acrylate derivatives, aliphatic or aromatic epoxides as disclosed in EP 0826431 A1, further vinyloxy derivatives, mercaptan substituted aliphatic or aromatic monomers or oligomers, unsaturated polyesters, bisallyl substituted ammonium compounds as disclosed in EP 548 826 A2 or EP 1265942 A2 including their mixtures with one another.

Preferred are light-curable polymer compositions, such as photo-curable flowable polymer, oligomer and/or monomer compositions, for example those containing:
(A) one or more polymers, oligomers and/or monomers having one or more photo-reactive groups,
(B) one or more catalysts,
(C) optionally one or more sensitizers,
(D) optionally one or more inhibitors,
(E) optionally one or more components being reactive to component (A),
(F) optionally one or more fillers.

Particularly, component (A) can be selected from flowable polyorganosiloxanes with photo-reactive or photo-curable functional groups.

In a preferred embodiment the component (A) is selected from polyorganosiloxanes (A1), comprising siloxy units having the formula:

$$R_a R^1_b SiO_{(4-a-b)/2} \quad (1),$$

wherein the groups R, which may be identical or different, are substituted or unsubstituted monovalent hydrocarbon groups having no photo-reactive groups; the groups $R^1$, which may be identical or different, are photo-reactive groups; and a and b are integers from 0 to 3 and represent the indexes for the respective siloxy unit (M, D, T or Q), thus for
M: a+b=3,
D: a+b=2,
T: a+b=1,
Q: a+b=0,
which on average have less than 10 mol-% branching units (T, Q), and preferably have a viscosity of from 0.01 to 100,000 Pa·s at 25° C., and wherein preferably the molar ratio is $R^1/Si=2/10000$ to $2/10$, thus $2*10^{-4}$ to 0.2, and/or
(A2) photo-reactive polyorganosiloxanes of the formula

$$R_a R^1_b SiO_{(4-a-b)/2} \quad (1'),$$

wherein a and b are as defined above, but which contain on average more than 10 mol-% branching units (T, Q), i.e. are resin-like, which are solid or liquid at room temperature (25° C.). Preferred are photo-reactive polyorganosiloxanes (A2) with mainly M, T and Q units, wherein the molar ratio is $M/(Q+T)=0.4$ to 4.0, and the molar ratio is $R^1/Si=0.01$ to 0.50.

Furthermore, mixtures of various components (A1), various components (A2), as well as mixtures of one or more components (A1) with one or more components (A2) can be used as the component (A).

In the polyorganosiloxane of formula (1) or (1'), the monovalent hydrocarbon groups represented by R are preferably those having 1 to 10 carbon atoms, especially 1 to 8 carbon atoms, such as for example alkyl groups, selected from the group consisting of methyl, ethyl, n-propyl, isopropyl, n-butyl, isobutyl, tert-butyl, pentyl, hexyl, octyl and decyl, cycloalkyl moieties such as cyclopentyl and cyclohexyl, aryl moieties such as phenyl and tolyl, and aralkyl groups such as benzyl and phenylethyl.

In the polyorganosiloxanes of formula (1) or (1') in some extent, for example up to 20 mol-%, preferably up to 10 mol-%, even more preferably up to 5 mol-% (based on the number of silicon atoms) alkoxy groups can be present as group R, such as those having 1 to 8 carbon atoms, in particular 1 to 4 carbon atoms, such as methoxy, ethoxy, propoxy and butoxy.

R is not restricted to unsubstituted monovalent hydrocarbon (and, where applicable, alkoxy groups), but includes substituted forms of these groups, wherein some or all of the hydrogen atoms bonded to carbon atoms are replaced by halogen atoms, cyano groups, alkoxy groups or the like, for example, substituted hydrocarbon groups such as chloromethyl, 3,3,3-trifluoropropyl and cyanoethyl and substituted alkoxy groups.

Preferred are methyl, phenyl and 3,3,3-trifluoropropyl radicals at the silicon.

$R^1$ is a photo-reactive group selected from alkenyl groups, methacryloyl containing groups, alkenyloxyalkyl containing groups, such as vinyloxyalkyl containing groups, cyclohexenyl ethyl, limonyl, dicyclopentadienyl, norvornenyl, and epoxyalkyl containing groups.

The (meth)acryloyl containing groups comprise, for example, (meth)acryloxy alkyl groups, in which the alkyl moiety has 2 to 14 carbon atoms, such as γ-acryloxypropyl and γ-methacryloxypropyl.

The vinyloxyalkyl groups include, for example those in which the alkyl moiety has 3 to 8 carbon atoms, such as vinyloxypropyl.

The epoxy-containing groups include, for example glycidyloxy alkyl groups in which the alkyl moiety has 3 to 14 carbon atoms, such as γ-glycidyloxypropyl, and (3,4-epoxycyclohexyl) alkyl groups.

At least two, preferably 2 to about 10, photo-reactive groups represented by $R^1$ should be present per molecule. Polyorganosiloxanes with less than two photo-reactive groups represented by $R^1$ are not completely curable. It is noted, that $R^1$ can be bound to a silicon atom at the end or in the middle of a molecular chain.

Mainly according to their reaction mechanism the photo-reactive groups $R^1$ can be assigned to 3 groups, such as the radically activatable groups, the cationic radically activatable groups and those groups capable of hydrosilylation.

Preferred are the methacryloxypropyl, mercaptopropyl, vinyloxyalkyl, vinyl and γ-glycidyloxypropyl residues at the silicon.

The branched polyorganosiloxane (A2), which can preferably be used optional, is a silicone resin, which preferably has an increased amount of reactive groups $R^1$, thus contributing to an increased crosslinking density, if it is used in respective amounts. The component (A2) increases strength, tear strength and hardness. A similar effect is achieved by a component (A1), if it has a high concentration of 1-50 mol-% of reactive groups $R^1$, based on all the silicon atoms, and if added in an amount of 0.2 to 90 wt.-%, preferably 1 to 40 wt.-% based on the total amount of components (A1), for example, with a further component(s) (A1), which preferably has only 0.01 to 0.9 mol-% reactive groups.

With such mixtures, the use of reinforcing fillers may be fully or partially avoided, thereby maintaining the transparency of the composition on a high level. A high transparency of the light-curable polymer compositions facilitates deep penetration of the photo-activating UV radiation into the mold cavity in a process for the production of molded articles from photo-curable polymers.

The silicone resin (A2) is synthesized, for example, by mixing vinyldimethyl methoxysilane and tetramethoxysilane in the desired molar ratio, hydrolysing, condensing into a polymer and optionally equilibrating. In other syntheses vinyltrimethoxysilane and tetramethoxysilane are co-hydrolysed in the desired ratio for introducing trifunctional T or Q groups. Instead of alkoxysilanes, chlorosilanes or mixtures of chlorosilanes and alkoxysilanes can be used accordingly. Instead of tetramethoxysilane, for example, sodium silicate can also be used. Likewise, the use of hexaorganodisiloxanes is possible, such as 1,3-divinyl-1,1,3,3-tetramethyldisiloxane, which can be added to the hydrolyzate, and condensed in the polymerization reaction or equilibrated.

The component (A2) can be used, for example, with up to 90 wt.-% (based on the total amount of components (A1) and (A2)), if duromer, brittle properties of the cured compositions are required or accepted.

Component (B) is selected from one or more catalysts, which can effect the curing of the photo-reactive groups in the component. Depending on the nature of the photo-reactive groups or the curing mechanism, the catalysts include, for example:

For the radical curing, that is, $R^1$ is an alkenyl, methacryloyl, alkenyl such as vinyl, allyl, hexenyl, cyclohexenylethyl, limonyl, functional polyorganosiloxane (A), these are: photoinitiators such as acylphosphine oxides, acetophenone, propiophenone, benzophenone, xanthol, fluorene, benzaldehyde, anthraquinone, triphenylamine, carbazole, 3-methyl acetophenone, 4-methyl acetophenone, 3-pentyl acetophenone, 4-methoxy acetophenone, 3-bromo acetophenone, 4-allyl acetophenone, p-diacetylbenzene, 3-methoxy benzophenone, 4-methyl benzophenone, 4-chlorobenzophenone, 4,4-di-methoxy benzophenone, 4-chloro-4-benzylbenzophenone, 3-chloroxanthone, 3,9-dichloroxanthone, 3-chloro-8-nonylxanthone, benzoin, benzoin ethers such as benzoin methyl ether and benzoin butyl ether, bis(4-dimethylaminophenol)ketone, benzyl methoxyketale and 2-chlorothioxanthone, photo-activatable peroxides, such as perbenzoate esters of the general formula:

$$A-O-O-CO-C_6H_5-B$$

wherein A is an alkyl or aryl group, and B is hydrogen, alkyl, halogen, nitro, amino, or amido, such as t-butyl perbenzoate, and the para-substituted derivatives thereof, such as t-butyl peroxy-p-nitrobenzoate, t-butyl peroxy-p-methoxybenzoate, t-butylperoxy-p-methylbenzoate and t-butyl peroxy-p-chlorobenzoate, azo compounds, such as azodicarboxylester, azodicarboxylic acid amide or azodiisobutyronitrile.

For the cationic curing, such as for epoxy functional or alkenyl ether functional, i.e. vinyloxy, propenoxy functional polydiorganosiloxanes, these are:
Onium salts such as described in U.S. Pat. No. 4,576,999:

$$R^5{}_2I^+MX_n{}^-$$

$$R^5{}_3S^+MX_n{}^-$$

$$R^5{}_3Se^+MX_n{}^-$$

$$R^5{}_4P^+MX_n{}^-$$

$$R^5{}_4N^+MX_n{}^-$$

wherein $R^5$ may be the same or different and is selected from organic radicals having up to 30 carbon atoms, such as aromatic hydrocarbon residues, the onium anion is selected from the group $MX_n$, wherein $MX_n$ is an anion such as $BF_4{}^-$, $PF_6{}^-$, $AsF_6{}^-$, $SbF_6{}^-$, $SbCl_6{}^-$, $HSO_4{}^-$, $ClO_4{}^-$, etc. More onium catalysts are known from EP 703 236 and U.S. Pat. No. 5,866,261, such as $B(C_6F_5)_4{}^-$ salts. Furthermore, onium catalysts comprise diazonium salts such as 4-morpholino-2,5-dimethoxy-phenyldiazonium fluoroborate.

For curing by hydrosilylation, that is, when using alkenyl functional polydiorganosiloxanes, the catalysts (B) are chosen from the group of photo-activatable hydrosilylation catalysts, in particular metal compounds such as Ag, Co, Fe, Ir, Os, Ni, Pd, Pt, Rh and Ru.

Examples for photo-activatable platinum catalysts (B) are the (η-diolefine)(σ-aryl)-platinum complexes, such as disclosed in U.S. Pat. No. 4,530,879 A: (wherein "COD" means cyclooctadiene, "COT" means cyclooctatetraene, and "NBD" means norbornadiene):
(1,5-COD)diphenylplatinum
(1,3,5,7-COT)diphenylplatinum
(2,5-NBD)diphenylplatinum
(3a,4,7,7a-tetrahydro-4,7-methanoindene)diphenylplatinum
(1,5-COD)-bis(4-methylphenyl)platinum
(1,5-COD)-bis(2-methylphenyl)platinum
(1,5-COD)-bis(2-methoxyphenyl)platinum
(1,5-COD)-bis(3-methoxyphenyl)platinum
(1,5-COD)-bis(4-phenoxyphenyl)platinum (1,5-COD)-bis(4-methylthiophenyl)platinum
(1,5-COD)-bis(3-chlorophenyl)platinum
(1,5-COD)-bis(4-fluorophenyl)platinum
(1,5-COD)-bis(di2,4-fluorophenyl)platinum
(1,5-COD)-bis(4-bromophenyl)platinum
(1,5-COD)-bis(4-trifluoromethylphenyl)platinum
(1,5-COD)-bis(di-3,5-trifluoromethylphenyl)platinum
(1,5-COD)-bis(3-trifluoromethylphenyl)platinum
(1,5-COD)-bis(2,4-bis(trifluoromethyl)phenyl)platinum
(1,5-COD)-bis(4-dimethylaminophenyl)platinum
(1,5-COD)-bis(4-acetylphenyl)platinum
(1,5-COD)-bis(trimethylsilyloxyphenyl)platinum
(1,5-COD)-bis(trimethylsilylphenyl)platinum
(1,5-COD)-bis(pentafluorophenyl)platinum
(1,5-COD)-bis(4-benzylphenyl)platinum
(1,5-COD)-bis(1-naphthyl)platinum
(1,5-COD)-naphthylphenylplatinum
(1,5-COD)-bis(2H-chromen-2-yl)platinum
(1,5-COD)-bis(xanthene-1-phenyl)platinum
(1,3,5-cycloheptatriene)diphenylplatinum
(1-chloro-1,5-COD)diphenylplatinum
(1,5-dichloro-1,5-COD)diphenylplatinum
(1-fluoro-1,3,5,7-COT)diphenylplatinum
(1,2,4,7-tetramethyl-1,3,5,7-COT)-bis(4-methylphenyl) platinum
(7-chloro-2,5-NBD)diphenylplatinum
(1,3-cyclohexadiene)diphenylplatinum
(1,4-cyclohexadiene)diphenylplatinum
(2,4-hexadiene)diphenylplatinum
(2,5-heptadiene)diphenylplatinum
(1,3-dodecadiene)diphenylplatinum
bis[$\eta^2$-2-(2-propenyl)phenyl]platinum
bis[$\eta^2$-2-(ethenylphenyl)platinum
bis[$\eta^2$-2-(cyclohexene-1-ylmethyl)phenyl]platinum.

Further photo-activatable catalysts include ($\eta$-diolefine) (sigma-alkyl)-platinum-complexes, such as
(1,5-COD)Pt(methyl)$_2$
(1,5-COD)Pt(benzyl)$_2$
(1,5-COD)Pt(hexyl)$_2$.

Particularly preferred catalysts in view of their reactivity and curing speed are:
($\eta^5$-cyclopentadienyl)-trialkyl-platinum-complex compounds with (Cp=cyclopentadienyl) such as
(Cp)trimethylplatinum
(Cp)ethyldimethylplatinum
(Cp)triethylplatinum
(Cp)triallylplatinum
(Cp)tripentylplatinum
(Cp)trihexylplatinum
(methyl-Cp)trimethylplatinum
(trimethylsilyl-Cp)trimethylplatinum
(phenyldimethylsilyl-Cp)trimethylplatinum
(Cp)acetyldimethylplatinum
(Cp)diethylmethylplatinum
(Cp)triisopropylplatinum
(Cp)tri(2-butyl)platinum
(Cp)triallylplatinum
(Cp)trinonylplatinum
(Cp)tridodecylplatinum
(Cp)tricyclopentylplatinum
(Cp)tricyclohexylplatinum
(chloro-Cp)trimethylplatinum
(fluoro-Cp)trimethylplatinum
(Cp)dimethylbenzylplatinum
(triethylsilyl-Cp)trimethylplatinum
(dimethylphenylsilyl-Cp)trimethylplatinum
(methyldiphenylsilyl-Cp)trimethylplatinum
(triphenylsilyl-Cp)trihexylplatinum
[1,3-bis(trimethylsilyl)-Cp]trimethylplatinum
(dimethyloctadecylsilyl-Cp)trimethylplatinum
1,3-bis[(Cp)trimethylplatinum]tetramethyldisiloxane
1,3-bis[(Cp)trimethylplatinum]dimethyldiphenyldisiloxane
1,3-bis[(Cp)dimethylphenylplatinum]tetramethyldisiloxane
1,3,5-tris[(Cp)trimethylplatinum]pentamethyltrisiloxane
1,3,5,7-tetra[(Cp)trimethylplatinum]heptamethyltetrasiloxane
(methoxy-Cp)trimethylplatinum
(ethoxymethyl-Cp)ethyldimethylplatinum
(methyoxycarbonyl-Cp)trimethylplatinum
(1,3-dimethyl-Cp)trimethylplatinum
(methyl-Cp)triisopropylplatinum
(1,3-diacetyl-Cp)diethylmethylplatinum
(1,2,3,4,5-pentachloro-Cp)trimethylplatinum
(phenyl-Cp)trimethylplatinum
(Cp)acetyldimethylplatinum
(Cp)propionyldimethylplatinum
(Cp)acryloyldimethylplatinum
(Cp)di(methacryloyl)ethylplatinum
(Cp)dodecanoyldimethylplatinum and
trimethylplatinum-cyclopentadienyl-terminal polysiloxanes.

Most preferred are optionally alkyl- or triaikylsilyl-substituted cyclopentadienyl-tris-alkyl-platinum-compounds, cyclopentadienyl-tris-(triorganosilyl)alkyl-platinum-compounds, particularly alkylcyclopentadienyl-trimethyl-platinum, such as methyl-cyclopentadienyl-trimethyl-platinum. Furthermore, for example Pd-acetylacetonate or Pd 3-methyl acetylacetonate can be selected, too.

Furthermore, there can be used: platinum diketonates such as Pt-acetylacetonate see US 2003/0199603, U.S. Pat. No. 6,150,546, U.S. Pat. No. 6,127,446 (GE), Pt-trialkyl-diketonates of WO 95/25735, Ru complexes of US 2004/0105934, with all catalysts, which are disclosed in the aforementioned patent documents, are encompassed by the disclosure of the present invention.

The amount of component (B) for the hydrosilylation reaction curing systems is advantageously about 0.1 to 1000 ppm, preferably 0.5-500 ppm, more preferably 1-100 ppm, more preferably 2-50 ppm, even more preferably 2-20 ppm, calculated as metal and based on the weight of component (A).

The crosslinking rate is among others determined by the selected catalyst compound, its quantity and also the type and amount of the optionally used additional component (D), the inhibitor for the hydrosilylation reaction.

For the photo-activatable catalyst (B) the catalyst concentration for the radically curable compositions is 0.01 to 5 parts by weight, more preferably 0.01 to 0.5 parts by weight per 100 parts by weight of component (A).

For cationically curing compositions, the amounts of the photo-activatable catalyst (B) is selected from up to 5 parts by weight per 100 parts by weight of component (A). Preferably, the catalyst (B) is added in the minimum amount which effects curing of the composition.

Less than 0.01 parts of the photo-activatable catalyst (B) in radically or cationically curable compositions are often not sufficient to cure the silicone rubber composition. With more than 5 parts of the photo-initiator (B), the light transmittance can be decreased so that the curing reaction may last too long.

The photo-curable compositions based on the component (A) comprising polymers, oligomers and/or monomers having one or more photo-reactive groups, such as in particular flowable silicone rubber compositions containing, for example (A1) and/or (A2), optionally contain one or more sensitizers (C). Sensitizers (C) are those compounds capable of absorbing electromagnetic radiation within the visible region of light spectrum, i.e. 400 nm to 800 nm, and this energy can be transferred to the catalyst. They should advantageously have an energy of the triplet term of at least 130 kJ/mol. Representative examples include, for example, polycyclic aromatic sensitizers, such as anthracene, 9-vinyl anthracene, 9,10-dimethylanthracene, 9,10-dichloroanthracene, 9,10-dibromoanthracene, 9,10-diethylanthracene, 9,10-diethoxyanthracene, 2-ethyl-9,10-dimethylanthracene, naphthacene, pentacene, benz[a]anthracene, 7,12-dimethylbenz[a]anthracene, azulene, aromatic ketones such as 2-chlorothioxanthone, 2-isopropylthioxanthone, thioxanthone, anthraquinone, benzophenone, 1-chloroanthraquinone, bianthrone, and the like.

In the case of silicone rubber compositions curable by hydrosilylation reaction, containing, for example, the components (A1) and/or (A2), those optionally contain one or more inhibitors (D), which affect the rate of the hydrosilation reaction. Thus, the rate of crosslinking can be influenced and it can, for example be assured that the hydrosilylation reaction does not begin to cure silicone rubber prematurely, especially outside the mold cavities. Examples of the known inhibitors include, for example: ethylenically unsaturated amides (U.S. Pat. No. 4,337,332); acetylenic compounds (U.S. Pat. No. 3,445,420, U.S. Pat. No. 4,347,346), isocyanates (U.S. Pat. No. 3,882,083); unsaturated siloxanes (U.S. Pat. No. 3,989,667); unsaturated diester (U.S. Pat. No. 4,256,870, U.S. Pat. No. 4,476,166 and U.S. Pat. No. 4,562,096), hydroperoxides (U.S. Pat. No. 4,061,609), ketones (U.S. Pat. No. 3,418,731); sulfoxides, amines, phosphines, phosphites, nitriles (U.S. Pat. No. 3,344,111), diaziridines (U.S. Pat. No. 4,043,977) as alkynols such as those described in U.S. Pat. No. 3,445,420, such as ethynylcyclohexanol and 3-methylbutynol and unsaturated carboxylic esters (U.S. Pat. No. 4,256,870) and diallyl maleate and dimethyl maleate and the fumarates of U.S. Pat. No. 4,562,096 and U.S. Pat. No. 4,774,111, such as diethyl fumarate, diallyl fumarate and bis-(methoxyisopropyl) maleate, further vinylsiloxanes, such as 1,3-divinyltetramethyldisiloxane, or tetravinyl tetramethyl tetracyclosiloxane.

The amount of inhibitor component is selected so that the desired curing time can be adjusted under the chosen processing conditions, particularly in coordination with the catalyst (B) and the other components in an appropriate manner, i.e. time and temperature. The amount of inhibitor component is preferably from 0.0001 to 2 wt.-% of one or more inhibitors based on the amount of the component (A).

Optionally, the photo-curable, flowable polymer, oligomer and/or monomer composition, such as, for example the photo-curable silicone rubber composition, contains one or more component(s) (E), reactive to component (A), which builds up chemical bonds with (A) in the sense of polymerization, oligomerization or cross-linking.

In the case alkenyl functional polyorganosiloxanes (A), curable by hydrosilylation, the photo-curable silicone rubber compositions necessarily have SiH functional polyorganosiloxanes as component (E). Preferably, in this case at least one of the components (A) or (E) has a higher functionality than 2, so that cross-linked structures are formed. As the SiH functional organopolysiloxanes (E), for example the SiH-functional polyorganohydrogensiloxanes are selected from the group of linear, cyclic or branched SiH-containing polyorganosiloxanes such as $$HR_2SiO(R_2SiO)_z(RHSiO)_pSiR_2H \quad (2a)$$

$$HMe_2SiO(Me_2SiO)_z(MeHSiO)_pSiMe_2H \quad (2b)$$

$$Me_3SiO(Me_2SiO)_z(MeHSiO)_pSiMe_3 \quad (2c)$$

$$Me_3SiO(MeHSiO)_pSiMe_3 \quad (2d)$$

$$\{[R_2R^3SiO_{1/2}]_{0-3}[R^3SiO_{3/2}][R^4O]_n\}_m \quad (2e)$$

$$\{[SiO_{4/2}][R^2O_{1/2}]_n[R_2R^3SiO_{1/2}]_{0.01-10}[R^3SiO_{3/2}]_{0-50}[RR^3SiO_{2/2}]_{0-1000}\}_m \quad (2f)$$

with
z=0 to 1000
p=0 to 100
z+p=1 to 1000
n=0.001 to 4
m=1 to 1000,
wherein $R^2O_{1/2}$ is an alkoxy residue at the silicon,
$R^3$=hydrogen or R, as defined above, preferably $C_1$-$C_{12}$-alkyl, $C_1$-$C_{12}$-alkoxy($C_1$-$C_{12}$)-alkyl, $C_5$-$C_{30}$-cycloalkyl or $C_6$-$C_{30}$-aryl, $C_1$-$C_{12}$-alkyl($C_6$-$C_{10}$)-aryl, wherein these residues each may optionally be substituted by one or more F-atoms and/or may contain one or more O-groups, with the proviso that at least two residues $R^3$ each are hydrogen.

In this system, curable by hydrosilylation, the ratio of component (E) to component (A) is preferably chosen so that a molar ratio of Si—H to Si-alkenyl units from about 0.5 to 20:1, preferably from 1 to 3:1 is present. The preferred amount of polyorganohydrogensiloxanes used as component (E) is 0.1 to 200 parts by weight based on 100 parts by weight of component (A). By the molar ratio of SiH to Si-alkenyl units, many properties such as rubber mechanical properties, the rate of crosslinking, the stability and stickiness can be influenced.

The polyorganohydrogensiloxanes (E) may be linear, branched, cyclic. The polyorganohydrogensiloxanes have, for example, a viscosity of about 5 to 1000 mPa·s at 25° C.

In the case of radically curing silicone compositions, in which particularly alkenyl or methacryloyl functional polydiorganosiloxanes (A) are used, optionally polyfunctional mercapto compounds can be used as a crosslinker (E), such as the mercapto compounds described in EP 832 936 A1, especially mercaptosilanes or mercaptopolysiloxanes having 2 to 50 mercapto groups. Substantially, even monomers, oligomers or polymers having polyfunctional radically crosslinkable groups, can be used without restrictions, such as polyalkenyl compounds, such as glycerin tri(meth)acrylate, trimethylolpropane tri(meth)acrylate, pentaerythrite tri(meth)acrylate or pentaerythrite tetra(meth)acrylate.

The photo-curable compositions used according to the invention may optionally contain one or more fillers as component (F), as commonly used in photo-curable compositions such as silicone rubbers, as far as they are sufficiently transmissible for photo-activating UV light. Therefore, particularly reinforcing fillers having no light-scattering aggregates are preferred, thus preferably those which are smaller than 200 nm. Reinforcing fillers (F) satisfying this condition are, for example, selected from the group including, organic and inorganic resins being solid at 25° C., such as silsesquioxanes, metal oxides or metal oxide hydroxide gels, such as of Al, B, Ce, Ga, In, Si, Zn, Ti, Sn, Sb. Preferred are silicas or silica gels having an average primary particle size in the range of 5-20 nm and specific surface areas according to BET of 150 to 400 m²/g, which are prepared by various methods such as flame hydrolysis, precipitation methods, sol-gel methods, etc. Examples include: fumed silicas such as Aerosil (Evonik), HDK (Wacker), Cab-O-Sil (Cabot).

The term filler (F) includes fillers having hydrophobic or dispersing agents or process aid agents bound to the surface, which influence, preferably reduce the interaction of the filler with the polymer, such as the thickening effect. To achieve such hydrophobation, preferably the known silicone compounds are used for the respective surface treatment of the fillers. Preferred are alkyl or alkenylsilanes or alkyl or alkenylsiloxanes. The surface treatment can, for example, be carried out "in situ" by the addition of silazanes, such as hexamethyl disilazane and/or 1,3-divinyl tetramethyl disilazane, by adding water. This so-called 'in-situ' hydrophobation is preferred. It can also be carried out with other common filler-treatment agents such as vinylalkoxy silanes, e.g. vinyl trimethoxysilane, other silanes with unsaturated organo functional groups, such as methacryloxypropyl, epoxyalkyl or mercaptoalkyl trialkoxysilanes. Likewise polyorganosiloxandioles having chain lengths from 2 to 50, carrying unsaturated organic or other organo functional groups to provide reactive sites for the crosslinking reaction, are known. Examples of commercially available silicas, previously being made hydrophobic with various silanes, are Aerosil R 972, R 974, R 976 or R 812 or e.g. HDK 2000 or H30. Exemplary trade names of so-called hydrophobic precipitated silicas, in english 'wet silica', are Sipernat D10 or D15 from Evonik. These silicas, previously being made hydrophobic, are less preferred than the silicas being made hydrophobic 'in-situ' with silazanes. With the selection of the amount of the filler type, its amount and the type of hydrophobation, the rubber mechanical properties and rheological, i.e. technical processing properties of the silicone rubber compounds can be influenced. Further preferred fillers are the highly transparent silicas, which are produced by hydrolysis and condensation of tetralkoxysilanes and hexamethyldisilazane and/or 1,3-divinyl tetramethyl disilazane. For illustration, the U.S. Pat. No. 4,344,800 is cited, which exemplarily defines these silicas.

For the preparation of molded articles from photo-curable polymer compositions these are preferably selected from compositions, which contain:
a) 100 parts by weight of at least one alkenyl group-containing polyorganosiloxane (A) having a viscosity range of 0.01 to 100 Pa·s (25° C., shear rate gradient D of 1 s$^{-1}$),
b) 0.5 to 1000 ppm of at least one photo-activatable hydrosilylation catalyst (B), calculated as metal based on the amount of components (A) to (B),
c) optionally one or more sensitizers,
d) optionally from 0.0001 to 2 wt.-% of one or more inhibitors based on the amount of components (A) to (E), and optionally further auxiliaries.
e) 0.1 to 200 parts by weight of at least one polyorganohydrogensiloxane (E) with 0.5 to 20 mol, preferably 1 to 5 mol of SiH groups per mol of alkenyl groups are used in (A),
f) 0 to 100 parts by weight of one or more fillers.

These polyorganosiloxane compositions can also be cured in large layer thicknesses or volumes in short time with UV light in the integral irradiation and molding unit of the present invention and can be removed from the mold without major sticking problems.

The integral irradiation unit of the invention for curing the above-mentioned light-curable polymer compositions comprises one or more UV light sources.

In the context of the present invention the term UV light means electromagnetic (actinic) radiation, which can effect curing of flowable, photo-curable polymer compositions, particularly silicone rubber compositions. The term "photo-activatable" is used in the sense of "light-activatable", wherein indirectly photo-activatable groups, which are, for example, activated by a photo-activatable catalyst, are included. Preferably, ultraviolet light with a maximum in the spectral distribution of the wavelengths in the range of 300 to 500 nm, especially ultraviolet light having a wavelength in the range of 300 to 400 nm, is used.

UV light sources according to the invention include in particular those, in which the portion of the total radiation in the range of >700 nm is less than 15% and in the range of <300 nm is less than 15%.

The total radiation mentioned herein refers to the portion of radiation which impinges upon the transparent element of the integral irradiation unit. Therefore, the term UV light source includes all elements of the irradiation unit, including optional wavelength sensitive filter or dichroic mirror elements, which are, for example used to additionally deflect IR radiation from the used radiation path.

UV light sources, in which the portion of the total radiation in the range of >700 nm is less than 15% and in the range of <300 nm is less than 15%, are thus characterized by providing radiation substantially in the region of the spectrum which effects an activation of the light-curable polymer compositions. This wavelength range is the wavelength range, in which the activation of the photo-curable polymer compositions or the reaction rate of the curing is at a maximum. This wavelength range depends on the used light-curable polymer composition, the catalysts used for this purpose, initiators, sensitizers etc. For the polymer compositions which are curable by hydrosilylation and which are preferred according to the present invention, the region of maximum activation or highest curing rate is generally at about 345 to 385 nm. By using UV light sources with a particularly low portion of radiation in the range of >700 nm and <300 nm, on the one hand the high-energy UV part, being harmful for some materials for transparent elements (transparent materials), is reduced and at the same time the portion of thermal radiation, being harmful both for the transparent materials as well as for the light-curable polymer compositions, is avoided. The high-energy UV radiation (wavelength range<300 nm) particularly affects, as already mentioned in the beginning, premature aging of the transparent plastic molded materials, such as from PMMA, which is expressed in a yellowing, embrittlement and deformation, and ultimately by the failure of the mold cavity, and which leads to high production costs. The thermal radiation of the UV light sources in the wavelength range of >700 nm leads to possible deformation of the transparent elements or the mold cavities, which just makes it unusable, however is reduced according to the present invention. By using UV light sources which inherently have a portion of the total radiation in the range of >700 nm of less than 15% and in the range of <300 nm of less than 15%, such as UV LED lamps having a maximum radiation in the range between 300 and 450 nm and a small width of radiation distribution, for example, of +/−25 nm, moreover, the energy used is at a maximum converted into a radiation which serves for activation, which makes the process extremely energy efficient.

The determination of the amounts of the total radiation of the UV light source in the range of >700 nm and of <300 nm can be done, for example, by irradiation of an appropriate measuring device, in particular a (spectral) photometer, photocells or a bolometer.

UV light sources that meet these requirements include, in particular, UV lamps with wavelength-selective filters and/or mirrors, UV LED and UV laser light sources. In principle, therefore all conventional UV lamps are suitable as UV light sources, preferably those in which the radiant energy in the wavelength range of <300 and >700 nm is suitably restricted, or such UV lamps, which due to the system already provide their UV radiation in a narrow wavelength range, such as a UV LED lamps or UV laser. Examples of conventional UV lamps include: fluorescent UV lamps, high-pressure mercury lamps, UV arc lamps, metal halide lamps, xenon lamps, flash lamps, undoped or Fe or gallium doped mercury lamps, black light lamps whose radiation is preferably suppressed in the range of <300 nm and of >700 nm, particular by using wavelength selective filters and/or mirrors. Examples of UV lamps, which due to the system already provide their UV radiation in a narrow wavelength range, include, for example, UV LED lamps or UV lasers, such as excimer laser. These are preferred because of their already low heat development. According to the invention preferably light sources are in particular selected, wherein the absorbed energy is converted as completely as possible into UV light usable for light-curing. These light sources already have a reduced portion of thermal radiation. Preferably, the portion of heat radiation with the wavelength between 700-10000 nm is less than 10% of total radiation. Although, hiding by wavelength-selective mirrors or filters can reduce the amount of heat radiation up to 85%, however, this effect is not always sufficient to prevent the undesirable high heating of the heat sensitive, transparent shaping elements. This is where the present invention approaches by providing the liquid layer. According to the invention the light sources are preferably selected from the group of UV LED lamps and UV lasers. Examples of such light sources are UV LED lamps, such as LED Powerline and LED PowerPen from the company Hönle, LED lamps from the company Dr. Gröbel Ettlingen or LED lamps from the company Phoseon Technology, such as the types FRDA 202, FRDA75. Further, particularly suitable are UV lasers, for example, from Crystal Laser Systems Berlin, for example of the type FDSS 355-300 plus or types of equivalent power in the UV wavelength range from Micro Optics LIMO Lissotschenko Mikrooptik GmbH in Dortmund. The laser light sources preferably also need a microoptics for spatial distribution or expansion of the tightly bundled laser beam before the transparent element in the integral molding and irradiation unit. Said radiation sources generate UV light with a maximum in the wavelength range of 300-500 nm, preferably the range of 250-400 nm, more preferably 320-385 nm. Conventional UV lamps, wherein the selected UV light spectrum is generated by using suitable filters and dichroic mirrors, include, for example, the UV Print HPL of the company Hönle in Gräfeling/Munich. By using UV LED radiation sources, preferably very narrow wavelength ranges of ±20 nm around a desired maximum value can be selected for respective photo-activatable polymer compositions, then making practically more than 80% of the incident radiant power available for photo-curing. For example, the sigma platinum catalysts (B) can preferably be activated with LED UV light sources in the range of 365±20 nm. The UV light sources used advantageously have a power of 0.1-12,000 mW/cm$^2$. In order to fully achieve the area to be irradiated, in an integral irradiation unit a plurality of such radiation sources can be arranged, if necessary connected, to form a plain-like radiation assembly. The molds for receiving the light-curable polymer composition may be partially or completely transparent or non-transparent to the UV light. The case of non-transparent molds can occur if the irradiation of the light-curable polymer compositions occurs outside of the mold cavity, as already mentioned above, for example, in an injection channel, which requires a correspondingly sufficiently long pot life or gel time of the light-curable polymer composition, to transfer the irradiated polymer composition into the mold cavity without being cured before in such an extent that prevents the transfer into the mold cavity. The mold cavity may be formed of conventional materials, such as ceramic, metal, plastic and/or glass, and their surfaces prevent adhesion of the cured polymer composition, either per se or due to appropriate equipment. The selection of the mold cavity material therefore particularly depends on the adhesive properties or mutual limited solubility of the polymer composition to be cured. For example, in the preferred case of photo-curable silicone compositions, non-adhesive mold cavity materials of transparent materials, such as poly(meth)acrylates, and/or non-transparent materials, such as optionally coated metals, are used. Contrariwise, in the case of using photo-curable polymer compositions on the basis of acrylates in particular a mold cavity on the basis of transparent silicones and/or optionally coated metals or transparent plastics is used. Preferred are materials which are easily processable, such as plastics or metal. If the mold cavities are constructed partially or entirely of transparent elements, these are preferably made of transparent plastics, such as listed below for the transparent elements. If the mold cavities only partially consist of transparent elements or are entirely non-transparent, then the non-transparent elements preferably consist of metal. The size of the mold cavities depends on the form to be created. Generally, the irradiation unit of the invention can be provided in any size, provided that the selected dimensions allow sufficient radiation curing of the light-curable polymer composition. Thus, the mold cavities may have in a casting process a longest dimension of up to 10 m and a volume of up to 300 liters, for example, for receiving large-volume electric isolator components. The longest dimension of the molded article may be more than 0.5 m, preferably more than 1 m. For large volumes, at least about 0.5 liter, more preferably at least about 3 liters, more preferably at least about 10 liters are preferred. Especially with large volume molded articles of at least about 20 liters optimum results can be achieved with the irradiation unit of the invention, as the required high radiation power can be provided with a low heat development, without causing any adverse effects on the mold cavities or on the transparent elements, i.e. thermal deformation, stress cracks or adhesion. For these large-sized castings the shortest diameter is usually about 1 cm, preferably at least about 5 cm, still more preferably at least about 10 cm. In another embodiment, also very small molded articles down to the microliter range can be produced with the injection molding process. These molded articles have, for example, a volume of 0.001-500 ml and a minimum thickness of 0.01 to 10 mm. Here, too, the use of the compact irradiation and molding unit is advantageous because in this dimension range injection molding machines can advantageously be used, which allow the largely automated production of UV light-cured molded articles. It must be possible to open the mold cavities for removal of the cured articles. This means that they are usually formed of at least two shaping elements, which are detachably associated to each other, which commonly have one or more mold parting surfaces. After curing the photo-curable polymer composition, the shape-providing elements are detached from one another and the cured molded body or molded article can be removed. In particular, this can take place automatically, by accordingly positioned stopper or by using compressed air.

The materials for the transparent layer, which optionally completely form the mold cavity, is for example selected from the group consisting of: acrylates, in particular polymethylmethacrylate (PMMA), such as Plexiglas® Roehm &

Haas Evonik, polyethylene dicyclopentadiene polymer (COC) such as Apel® Mitsui Chemicals Topas® COC, Crystal® DEW, silica glass, polymethacryl methylimid (PMMI) thus partially imidized methacryl polymers such as e.g. with the name Kamax®, in Europe from Röhm with the name Pleximid®, polyorganosiloxane, such as from Momentive Performance Materials, which may optionally be non-stick coated on the surface. It has, inter alia, been found that common industrial grade PMMA cannot be used because of excessive absorption of UV light. Rather suitable are those PMMA types which have a high UV transmissability, in which in particular UV stabilizers are essentially excluded in the production. Examples of such types of PMMA include, for example, Plexiglas® 0Z18. Similarly UV absorbing additives must preferably be avoided or replaced by suitable low absorbing additives in other materials used for the production of the transparent elements or must be completely avoided. The UV light transparent layer is sized to withstand the inner mold pressure (such as those having a thickness of at least about 1 mm, preferably at least 5 mm, even more preferably at least about 25 mm). At the same time a sufficiently large passage area for the irradiated UV light must be provided to allow sufficiently rapid curing. The required passage area is determined by the required UV radiation energy, the desired curing time, and the available power of the UV light sources, to produce in economically meaningful cycle times 1-600 s/molded article. It is advantageous to provide radiation power up to 12 W/cm$^2$ and transparent passage areas for the UV light of 0.1 to $1*10^4$ cm$^2$, preferably 1-100 cm$^2$ per lamp or per lamp panel. To increase the radiation transmitting the transparent layer and for shortening the curing time, the light of a plurality of UV light sources can be focused, particularly by using appropriate mirrors and/or lenses. This may particularly be necessary in the case of small transparent elements, as their surface is too low for receiving the light of several UV light sources. In other words, a focusing is useful in those cases in which the radiation surface of the UV light source is larger than the UV light transmitted area of the transparent layer. The transparent layers, as such can be used to build the complete mold cavity, or only parts of the mold cavity are opened by the transparent layer for the light entry. To improve the radiation effect the irradiation unit of the invention can optionally comprise one or more light-conducting and/or light reflecting elements. This embodiment is suitable for example in cases where the mold cavities exhibit shadowed areas, for example, by inserts present in the mold cavity, which direct the UV light in the desired area of the mold cavity or the photo-curable mass present therein, by reflection or light-conduction. Suitable light-conducting and/or light-reflecting elements include, for example: reflective elements such as spherical reflective elements which generate a concave light-reflection, or surface-shaped reflective elements, light conductors, such as fiber optic bundles, etc. The light-conducting and/or light-reflecting elements can be arranged outside as well as inside the mold cavity so that they are part of the design. Thus, for example in the case of a shaped cavity a correspondingly shaped spherical reflective element can be disposed inside the mold cavity.

As mentioned above, the irradiation unit preferably has one or more injection channels for the light-curable polymer composition, which allow injection of the photo-curable polymer composition, optionally with prior or concurrent irradiation, into the mold cavity. Depending on the desired injection rate (volume/unit time) the injection channels have a diameter, for example, of about 0.5 to 8 mm. The dimensions of the gate or gate link are preferably in the range of 0.2-10 mm. The mold cavity must have a pressure difference against the external pressure, preferably in cooperation with the injection channels, especially to allow a blow free filling of the mold cavity. The pressure difference may, for example be at least about 0.1 bar, preferably at least about 0.5 bar. This includes filling under vacuum being applied to the mold cavity. Furthermore, the irradiation and molding unit may have venting channels for venting of the mold cavities during filling to provide a bubble-free cured article. Such venting channels have, for example, a diameter of at least about 1 mm. Additionally, the parting lines of the mold cavities can be used for venting.

The invention further relates to the use of the irradiation and molding unit of the present invention for the production of polymer molded articles or polymer coated articles, such as seals, large-volume electrical insulators, such as high voltage insulators, field control elements, thyristors, cable insulation, cable sleeves, opto coupler of light-conductors, cable connectors, encapsulation composites, cable terminations, which optionally consist of various materials such as conductive, non-transparent elastomers, thermoplastics, which are pre-disposed into the mold cavity, active ingredient-containing carrier materials, laminates, cable insulation, sealings on food container made of metal or plastics, etc.

Preferably, the said polymer molded articles or polymer coatings, which are prepared by using the integral irradiation unit of the invention are from silicone materials.

By means of the irradiation and molding unit of the present invention a variety of molded articles can easily be prepared from the photo-curable polymer materials with high productivity. Such moldings can be, for example: seals, such as gaskets with carrier layer, O-rings, cable insulators, insulators, or other moldings.

In the following, the preferred embodiments of the invention are summarized again:

1. Irradiation or molding unit for curing light-curable polymer compositions comprising:
   one or more UV light sources for irradiating at least one transparent layer which is in contact with the light-curable polymer composition, and which is located between the UV light sources and the photo-curable polymer composition,
   at least one mold for receiving the light-curable polymer composition, and
   at least one liquid layer which is located between the transparent layer and one or more UV light sources, and which is not permanently fixed to the UV light sources.
2. Irradiation unit according to the aforementioned embodiment 1, characterized in that the thickness of the liquid layer is between 0.01 mm to 50 mm.
3. Irradiation unit according to the aforementioned embodiment 1 or 2, characterized in that the thickness of the liquid layer is sized to absorb at least 70% of the portion of the total radiation of the UV light sources in the range of >700 nm.
4. Irradiation unit according to one of the aforementioned embodiments 1 to 3, characterized in that the liquid layer is in contact with said transparent layer as well as with the UV light sources.
5. Irradiation unit according to one of the aforementioned embodiments 1 to 4, characterized in that between the UV light source and the liquid layer a spacing in the range of 1 to 150 mm is provided.
6. Irradiation unit according to one of the aforementioned embodiments 1 to 5, characterized in that means for the exchange of the liquid in the liquid layer are provided.

7. Irradiation unit according to one of the aforementioned embodiments 1 to 6, characterized in that the mass flow rate in the liquid layer is at least 0.1 g/(min·cm$^2$).
8. Irradiation unit according to one of the aforementioned embodiments 1 to 7, characterized in that the liquid layer is in contact with the transparent layer.
9. Irradiation unit according to one of the aforementioned embodiments 1 to 8, characterized in that the liquid layer is located between the transparent layer and a transparent covering layer, and is in contact with these.
10. Irradiation unit according to one of the aforementioned embodiments 1 to 7 and 9, characterized in that the liquid layer is located between two transparent covering layers, which are located between the UV light sources and the transparent layer.
11. Irradiation unit according to the aforementioned embodiment 10, characterized in that the covering layer facing away from the UV light source is in contact with the transparent layer.
12. Irradiation unit according to one of the aforementioned embodiments 1 to 11, characterized in that the liquid layer in contact with a heat exchanger for dissipating heat.
13. Irradiation unit according to one of the aforementioned embodiments 1 to 12, characterized in that the liquid of the liquid layer absorbs IR radiation.
14. Irradiation unit according to one of the aforementioned embodiments 1 to 13, characterized in that the liquid of the liquid layer is transmissible to UV radiation.
15. Irradiation unit according to one of the aforementioned embodiments 1 to 14, characterized in that the liquid of the liquid layer is selected from the group consisting of: water, aliphatic alcohols, hydrocarbons, ionic liquids and salts as well as mixtures thereof.
16. Irradiation unit according to one of the aforementioned embodiments 1 to 15, characterized in that the liquid of the liquid layer comprises at least one IR-absorbing additive.
17. Irradiation unit according to one of the aforementioned embodiments 1 to 16, characterized in that in addition not liquid-based IR radiation filters are located between the UV light source and the transparent layer.
18. Irradiation unit according to one of the aforementioned embodiments 1 to 17, characterized in that the UV light source has a portion of the total irradiation in the range of >700 nm of less than 15% and in the range of <300 nm of less than 15%.
19. Irradiation unit according to one of the aforementioned embodiments 1 to 18, characterized in that it comprises one or more light-conducting and/or light reflecting elements.
20. Irradiation unit according to one of the aforementioned embodiments 1 to 19, characterized in that it comprises one or more injection channels for the light-curable polymer compositions.
21. Irradiation unit according to one of the aforementioned embodiments 1 to 20, characterized in that the UV light sources are selected from: UV-fluorescent lamps, high pressure mercury vapor lamps, UV arc lamps, metal halide lamps, xenon lamps, flash lamps, undoped or Fe or gallium doped mercury lamps, and black light lamps.
22. Irradiation unit according to one of the aforementioned embodiments 1 to 21, characterized in that the distance between the liquid layer and the UV light source is fixed or variable.
23. Irradiation unit according to one of the aforementioned embodiments 1 to 22, which consists of several sub-components which form the assembly of the irradiation unit.
24. Irradiation unit according to one of the aforementioned embodiments 1 to 23, which has one or more injection channels.
25. Irradiation unit according to one of the aforementioned embodiments 1 to 24, characterized in that said transparent layer is part of the mold for receiving the light-curable polymer compositions and/or is part of one or more injection channels.
26. Irradiation unit according to one of the aforementioned embodiments 1 to 25, wherein the transparent layer in contact with the light-curable polymer composition consists of a thermoplastic polymeric material.
27. Irradiation unit according to one of the aforementioned embodiments 1 to 26, wherein the mold for receiving the light-curable polymer composition consists of a thermoplastic polymer material.
28. Irradiation unit according to one of the aforementioned embodiments 1 to 27, wherein the mold for receiving the light-curable polymer composition comprises non-transparent portions.
29. Irradiation unit according to one of the aforementioned embodiments 1 to 28, comprising a plurality of UV light sources.
30. Irradiation unit according to one of the aforementioned embodiments 1 to 29, wherein the UV light source has a radiation of at least 0.1 mW/cm$^2$.
31. Irradiation unit according to one of the aforementioned embodiments 1 to 30 for the continuous or batchwise production of cured polymer moldings or for the production of articles having a cured polymer layer.
32. Irradiation unit according to one of the aforementioned embodiments 1 to 31, wherein the light-curable polymer compositions are light-curable silicone compositions.
33. Sub-component of the irradiation unit according to any of the aforementioned embodiments 1 to 32 which does not include the UV light source.
34. Molding unit for curing light-curable polymer compositions, comprising:
    at least one mold for receiving a light-curable polymer composition,
    at least one transparent layer which is in contact with the light-curable polymer composition, and which is transmissible to the UV radiation, and
    at least one liquid layer, which is arranged to be irradiated by irradiation of the transparent layer.
35. A process for the preparation of cured polymer moldings or articles coated with cured polymers, wherein one or more light-curable polymer composition is cured by using the irradiation unit according to one of the aforementioned embodiments 1 to 32 or the sub-component or molding unit according to embodiments 32 and 33.
36. The method of embodiment 35, comprising the steps of:
    a) optionally, assembling the components of the irradiation unit,
    b) optionally inserting one or more articles to be coated in the mold for receiving the light-curable polymer composition,
    c) introducing one or more light-curable polymer compositions into at least one or all of the existing molds, optionally by one or more injection channels,
    d) irradiating the light-curable polymer compositions through the transparent layer in the region of the injection channel and/or the mold for receiving the light-curable polymer composition, e) continuous or batchwise removal of the cured polymer molded articles or the polymer-coated articles.

37. The method of embodiment 36 which additionally comprises the steps of:
   a) determination of the effective wavelength range for activating the curing,
   b) selecting an UV light source having a maximum radiation in the effective wavelength range.

38. The method of embodiment 37, wherein the effective wavelength is in the range of 345 to 385 nm.

39. Use of the irradiation unit according to one of the aforementioned embodiments 1 to 32 or the sub-component or molding unit according to embodiments 32 and 33 for the production of polymer moldings or polymer-coated articles.

The embodiments and examples described are merely for illustrating the invention but are not intended to narrow the spirit and scope of the invention.

EXAMPLES

Example 1

Catalyst Mixture (B)

10,000 parts by weight of a linear vinyl-terminated polydimethylsiloxane (A1) having a viscosity of 1 Pa·s at 25° C. with a vinyl content of 0.13 mmol/g are mixed to the exclusion of light with 1 part by weight of trimethyl(methyl)cyclopentadienyl platinum as the component (B) from Fa. Strem with a platinum content of 61.1%, optionally by heating to 32° C. dissolved. The catalyst mixture with 0.006 wt. Pt metal must be kept to exclusion of light.

Example 2

Preparation of the Basic Mixture

In a kneader, 13.5 parts by weight of dimethylvinylsiloxy-terminated polydimethylsiloxane (A1) having a viscosity of 10 Pa·s at 25° C., 24.6 parts by weight of dimethylvinylsiloxy-terminated polydimethylsiloxane (A1) with a viscosity of 65 Pa·s at 25° C., 4.5 parts of hexamethyldisilazane, 0.04 parts by weight of 1,3-di-vinyltetramethyldisilazane and 1.5 parts by weight of water are mixed, followed by mixing with 17.2 parts by weight of pyrogenic silica (F) having a BET surface area of 300 m²/g, heating to approximately 100° C., stirring for about one hour and then releasing from water and excess silazane-/silanole deposits by evaporation at 150 to 160° C. and finally with vacuum at p=20 mbar. Subsequently, dilution with 17.4 parts by weight of a dimethylvinylsiloxy-terminated polydimethylsiloxane (A1) having a viscosity of 10 Pa·s is carried out. The starting material for the production of the following component mixtures is obtained.

Component Mixture 2-1

0.3 parts by weight of the catalyst (B) with a Pt content of 0.006 wt.-%, as obtained in example 1, are added to the basic mixture obtained above (about 89.5 parts by weight) under yellow light (exclusion of light below 700 nm).

Component Mixture 2-2

20.8 parts by weight of a crosslinking agent consisting of trimethylsiloxy-terminated polymethyl hydrogen dimethylsiloxane (E) having a viscosity of 35 mPa·s at 25° C. with an SiH content of 7.4 mmol/g of the general formula $M_2D_{20}D^H{}_{10}$ are added to the basic mixture obtained above (89.5 parts by weight) and thoroughly mixed into the basic mixture.

The component mixtures 2-1 and 2-2 of Example 2 are supplied to a static mixer with a piston dosing pump of the company 2KM in the volume ratio 90:110, there mixed together. Subsequently, the mixture is transferred into the mold cavities of the respective molds.

Example 3a Preparation of a High-Voltage Shield Element

The mixture of Example 2 is injected into a mold according to FIG. 5 at a temperature of 20-30° C. via an injection channel, filled in about 300 s and via the piston conveying unit a pressure of 3 bar is maintained. The cavity (4) has a volume of 3000 ml. The transparent mold (5) is completely formed from PMMA type Plexiglas® GS colorless type 0Z18 from the company Evonik RÖhm GmbH (thickness 10 mm, height 250 mm). The metallic mold wall (6) includes the elements (1) to (2) and (4) to (5), and together with them forms the cover of the irradiation and molding unit.

In a distance of 20 mm from the cooling channel (1) light with a maximum of the radiation in the wavelength range of 345-385 nm at an intensity of 40-80 W/cm² is irradiated for 120 s from a UV lamp perpendicularly to the cooling channel (1) with the two covering layers of PMMA, using a UV lamp with selected UV spectrum (portion of total irradiation in the range of >700 nm, less than 15% and in the range of <300 nm, less than 15%) of the type UVAPRINT 500 HPL. Fa. Hönle (2), equipped with H1 quartz jacket, air cooling and dichroic reflector mirror and a UV filter for the deflection of IR radiation. The cooling channel (1) has a thickness of the liquid layer of 5 mm and an irradiated area of 200 cm². Water with an inlet temperature of 20° C. is pumped through the cooling channel at a mass flow rate of 5 g/(min·cm²). After cooling the heated water is leaded back by a heat exchanger. After 80 cycles of irradiation with easy removal of the formed silicone moldings, the temperature of the UV-transparent insert on the side facing towards the UV light source reached a temperature of about 60° C. The cooled acrylate mold could be used more than 100 times without visible damage. Also the covering layer from PMMA facing towards the light source surprisingly showed no visible deformation and yellowing. No significant impairment of curing rate occurred. After 120 s irradiation period the molded article in the mold cavity (4) is crosslinked to a degree that a hardness of 25° Shore A is measured on the surface, and the molding can be removed. To remove the molding, the UV light source is turned off until further filling i.e. switched in standby without irradiation of the mold using a shutter. The moldings obtained have neither bubbles nor sticky surfaces.

Example 3b (Comparative Example)

Experiment 3a is repeated with the difference that the irradiation takes place without cooling channel. After 80 cycles of irradiation with easy removal of the formed silicone moldings, the temperature of the UV-transparent insert on the side facing towards the UV light source reached a temperature of about 80° C. After 100 irradiations cycles the non-cooled acrylate mold showed a deformation of the mold surface made from PMMA on the side facing towards the UV light and a yellowing of the irradiated area. UV transparency decreased remarkably, and micro-cracks occurred on the surface.

The invention claimed is:

1. An irradiation and molding unit for curing light-curable polymer compositions comprising:
one or more UV light sources for irradiating at least one UV transparent layer having a thickness of at least 5 mm which is in contact with a light-curable polymer composition, and which is located between the UV light sources and the light curable polymer composition, wherein the transparent layer which is in contact with the light-curable polymer composition is made of polymethylmethacrylate, at least one mold for receiving the light-curable polymer composition, and at least one liquid layer which is located between the transparent layer and one or more UV light sources, wherein said liquid layer is not part of the UV light source or its housing, and said liquid layer is in contact with said transparent layer, wherein the UV light configured to cure the light curable polymer composition in the mold.

2. The irradiation and molding unit according to claim 1, characterized in that the thickness of the liquid layer is between 0.01 mm to 50 mm.

3. The irradiation and molding unit according to claim 1, characterized in that the liquid layer is located between, and in contact with, the transparent layer and a transparent covering layer.

4. The irradiation unit according to claim 1, characterized in that the liquid layer is located between two transparent covering layers, which are located between the UV light sources and the transparent layer.

5. The irradiation and molding unit according to claim 1, characterized in that the liquid of the liquid layer absorbs IR radiation.

6. The irradiation and molding unit according to claim 1, characterized in that it comprises one or more injection channels for the light-curable polymer compositions.

7. The irradiation and molding unit according to claim 1, characterized in that the UV light source is selected from the group consisting of UV-fluorescent lamps, high pressure mercury vapor lamps, UV arc lamps, metal halide lamps, xenon lamps, flash lamps, undoped mercury lamps, Fe-doped mercury lamps, gallium doped mercury lamps, and black light lamps.

8. The irradiation and molding unit according to claim 1, characterized in that said transparent layer constitutes part of at least one of (a) the mold for receiving the light-curable polymer compositions and (b) one or more injection channels.

9. The irradiation and molding unit according to claim 1, wherein the light-curable polymer compositions are light-curable silicone compositions.

10. The irradiation and molding unit according to claim 2, characterized in that the liquid layer is in contact with said transparent layer.

11. The irradiation and molding unit according to claim 2, characterized in that the liquid layer is located between, and in contact with, the transparent layer and a transparent covering layer.

12. The irradiation and molding unit according to claim 2, characterized in that the liquid of the liquid layer absorbs IR radiation.

13. The irradiation and molding unit according to claim 2, characterized in that it comprises one or more injection channels for the light-curable polymer compositions.

14. The irradiation and molding unit according to claim 2, characterized in that the UV light source is selected from the group consisting of UV-fluorescent lamps, high pressure mercury vapor lamps, UV arc lamps, metal halide lamps, xenon lamps, flash lamps, undoped mercury lamps, Fe-doped mercury lamps, gallium doped mercury lamps, and black light lamps.

15. The irradiation and molding unit according to claim 1, characterized in that the UV light source is selected from the group consisting of UV-fluorescent lamps, high pressure mercury vapor lamps, UV arc lamps, metal halide lamps, xenon lamps, flash lamps, undoped mercury lamps, Fe-doped mercury lamps, gallium doped mercury lamps, and black light lamps.

* * * * *